(12) United States Patent
Maezawa et al.

(10) Patent No.: US 7,088,344 B2
(45) Date of Patent: Aug. 8, 2006

(54) DATA PROCESSOR, I/O DEVICE, TOUCH PANEL CONTROLLING METHOD, RECORDING MEDIUM, AND PROGRAM TRANSMITTER

(75) Inventors: Yasunori Maezawa, Sagamihara (JP); Takayuki Akai, Sagamihara (JP); Yuhko Ohmori, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 09/968,130

(22) Filed: Oct. 1, 2001

(65) Prior Publication Data

US 2002/0067347 A1    Jun. 6, 2002

(30) Foreign Application Priority Data

Oct. 11, 2000    (JP)    ............................. 2000-310149

(51) Int. Cl.
    *G09G 5/00*    (2006.01)
(52) U.S. Cl. ...................... 345/173; 345/160; 345/856; 715/863
(58) Field of Classification Search ................ 345/159, 345/160, 173–179, 856; 178/18.01, 18.03; 715/863–864, 784
See application file for complete search history.

(56) References Cited

U.S. PATENT DOCUMENTS

| | | | | |
|---|---|---|---|---|
| 5,326,940 A | * | 7/1994 | Doubrava et al. | 178/18.01 |
| 6,014,140 A | * | 1/2000 | Strand | 345/341 |
| 6,088,628 A | * | 7/2000 | Watanabe et al. | 700/264 |
| 6,525,749 B1 | * | 2/2003 | Moran et al. | 345/863 |
| 6,532,003 B1 | * | 3/2003 | Nagao | 345/168 |
| 6,532,005 B1 | * | 3/2003 | Campbell | 345/173 |
| 6,727,929 B1 | * | 4/2004 | Bates et al. | 715/862 |
| 6,880,131 B1 | * | 4/2005 | Nakazono et al. | 715/840 |
| 2003/0122774 A1 | * | 7/2003 | Harada | 345/156 |

FOREIGN PATENT DOCUMENTS

WO    WO 98/37506    * 8/1998

* cited by examiner

*Primary Examiner*—Richard Hjerpe
*Assistant Examiner*—Kimnhung Nguyen
(74) *Attorney, Agent, or Firm*—Louis Herzberg; Anne V. Dougherty (57) ABSTRACT

Provides control movement of a display area to an image displayed outside a display screen by means of a touch operation using a touch panel in such a general-purpose environment as a desk-top screen of an operating system. In an example embodiment, a data processing apparatus employs a touch panel unit as an input unit. The data processing apparatus includes an operation event detector for detecting an operation preset, to be distinguished from other normal inputs to the panel touch unit; a cursor movement information generator for generating movement information used to move a cursor positioned at the periphery of a display screen to the outside thereof; a cursor movement controller for moving the position of the cursor on a display image according to the generated movement information; and a virtual screen controller for scrolling an item displayed on the display screen according to a cursor movement.

15 Claims, 11 Drawing Sheets

DATA PROCESSOR, I/O DEVICE, TOUCH PANEL CONTROLLING METHOD, RECORDING MEDIUM, AND PROGRAM TRANSMITTER

FIELD OF THE INVENTION

The present invention relates to a touch panel, more particularly to a display area moving method for moving an area displayed on a display screen in case a display image is set and extended up to the outside of the display screen of a display device (hereinafter, to be referred to simply as the display screen).

BACKGROUND

In recent years, the output display of computer apparatuses are getting higher and higher in resolution. This is because a higher resolution makes it possible to display more data in one image. And, some application programs require a higher resolution than a certain level so as to display data.

In order to display such a high resolution image on a display screen, the display screen is also required to have the same high resolution. In case the resolution is raised on a display screen whose size is fixed, however, characters and patterns in display images are all shrunk according to the raised resolution, thereby the visibility of the display screen is lowered. This problem will be solved by use of a larger display screen; the resolution can be raised without shrinking the characters and patterns in the display images in this case. In the case of lap-top personal computers whose portability is very important, however, the problem still remains unsolved; because the display screen is limited physically, characters and patterns are unavoidably shrunk on the screen. In addition, even in the case of desk-top personal computers, the display screen cannot be expanded limitlessly because of their limited installation space.

In order to solve such the problem, there has been proposed a virtual screen display technique usable as means for displaying a high resolution image on a low resolution display screen. According to this technique, a display area (a view port screen) is set on a display image stored in a video memory and the data in this display area is displayed on the display screen. The view port screen is equal to the above-described display screen in size.

Figure 11:
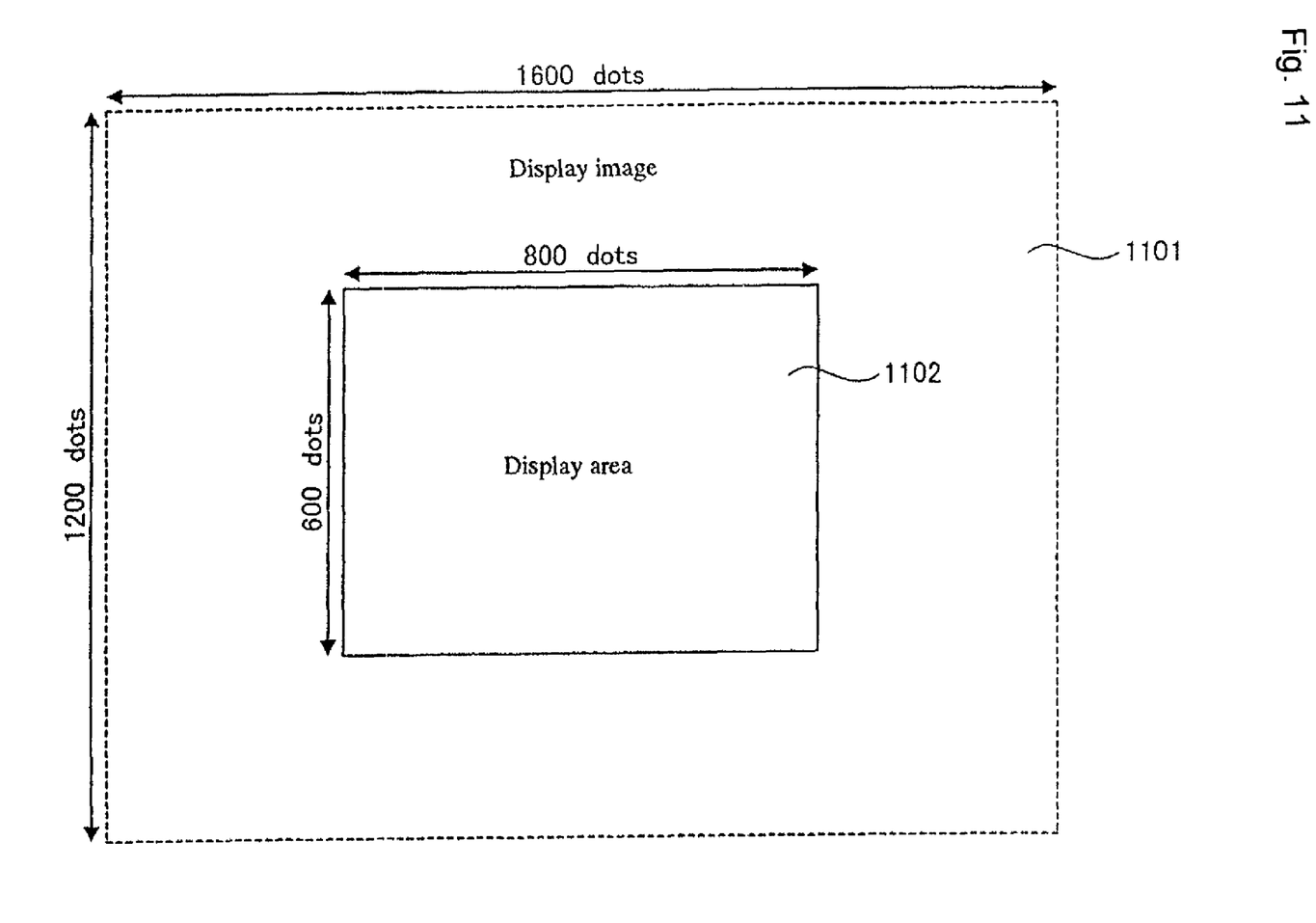
FIG. 11 shows a relationship between a display image stored in a video memory and a display area displayed on the display screen during display controlling on the display screen.

FIG. 11 is a chart for describing the relationship between a display image and the display area.

In FIG. 11, it is premised that the resolution of the display image 1101 is 1600 (dots)×1200 (dots) and the resolution of the display area 1102 is 800 (dots)×600 (dots). In this case, an area that is ¼ of the display image 11 in size is displayed on the display screen by taking the resolutions of both display image 1101 and display area 1102 into consideration.

According to this display technique that uses such a virtual screen, the display area 1102 can move on the display image 1101. And, when the display area 1102 moves on the display image 1101, the item displayed on the display screen is scrolled up/down and to the right/left. Generally, a GUI (Graphical User Interface) cursor (mouse pointer) is used to control the movement of such the display area 1102. Concretely, in case the mouse, while the cursor is positioned at the periphery of the display screen, is operated so as to move the cursor further to the outside of the periphery, the display area 1102 moves in the same direction in which the cursor moves.

Although it is easy to control the movement of the display area 1102 by moving the cursor as described above when a mouse, a track point, a track pad, a track ball, or the like is used, it is not so easy when a touch panel is used for controlling the movement of the display area 1102.

A touch panel is configured by a pressure-sensitive or an electrostatic panel placed on a display screen so that position information detected when a point on the display screen surface is touched is sent to a personal computer. On such a type of touch panel, when the display surface is touched by a finger of the user or an input stylus pen, the cursor is moved to the touched point.

A mouse, a track point, a track pad, a track ball, or the like uses relative pixel data so as to specify a relative point to which the cursor is to be moved from the current point. Consequently, such a device can move the cursor further to the outside of the periphery of the display screen even when the cursor is positioned at the periphery.

In case such a device is used as a pointing device, therefore, it will become easy to move the cursor to the outside of the display area 1102 on the display image 1101.

In the case of the touch panel, however, because the coordinates on the display screen correspond to the coordinates on the panel that accepts an input done by touching thereon (hereinafter, to be referred to simply as a touch input) at one to one, it is impossible to specify a point to which the cursor is to be moved outside the display area 1102. That is, because the periphery of the display screen comes to match with the periphery of the touch panel, the cursor cannot be moved to a point outside the periphery by touching it.

Figure 9:
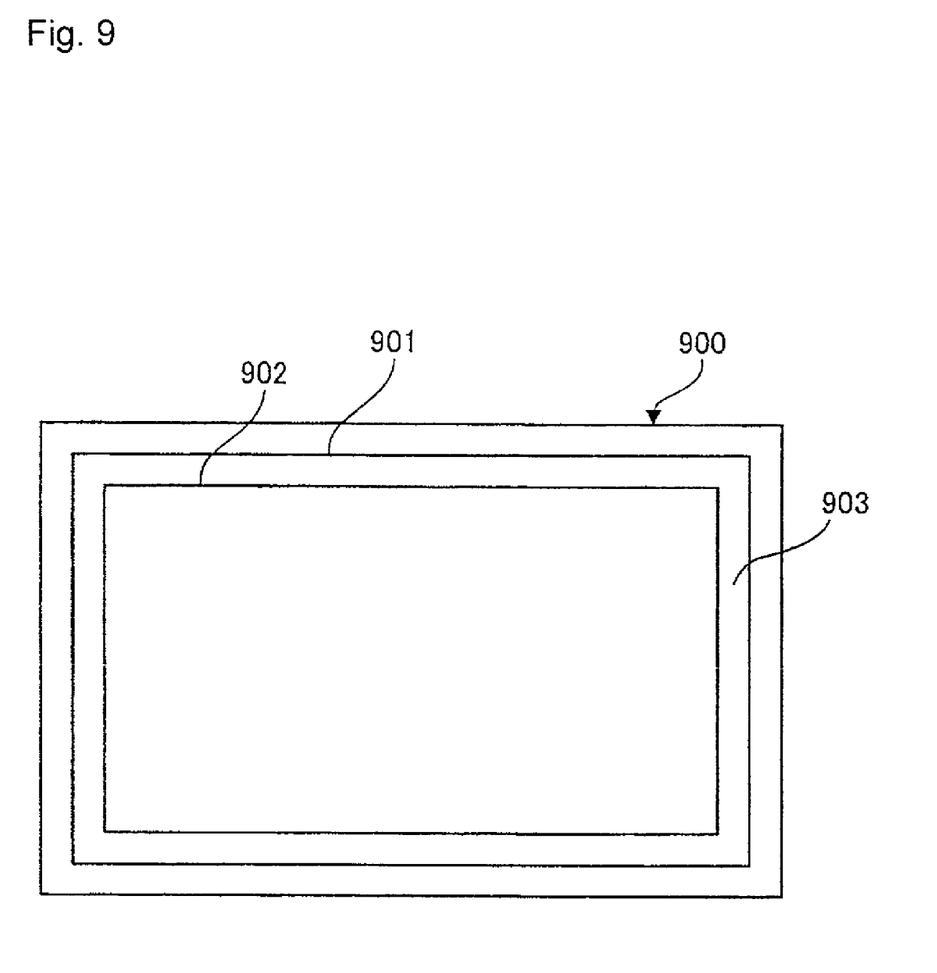
FIG. 9 shows an example for describing how display controlling is done on a conventional touch panel.

In order to solve this problem, a conventional technique employs a display method that uses a virtual screen and a touch panel, which is a pointing device. FIG. 9 is an illustration for describing the conventional technique. In FIG. 9, a display device 900 has areas 901 and 902. The area 901 is effective for accepting a touch input. The area 902 is an effective display area in which an image is displayed. The area 902 is equivalent to a display screen. As shown in FIG. 9, the area 901 is larger than the area 902; the area 901 spreads up to the periphery of the area 902. Concretely, this conventional technique has areas for accepting touch inputs outside the display screen.

This conventional technique accepts a touch input as an operation for specifying a movement of an item displayed on the display screen to the outside thereof on the virtual screen so as to scroll the item in case the touch input is done in the area 903 that is not overlaid on the area 902 in the area 901.

Figure 10:
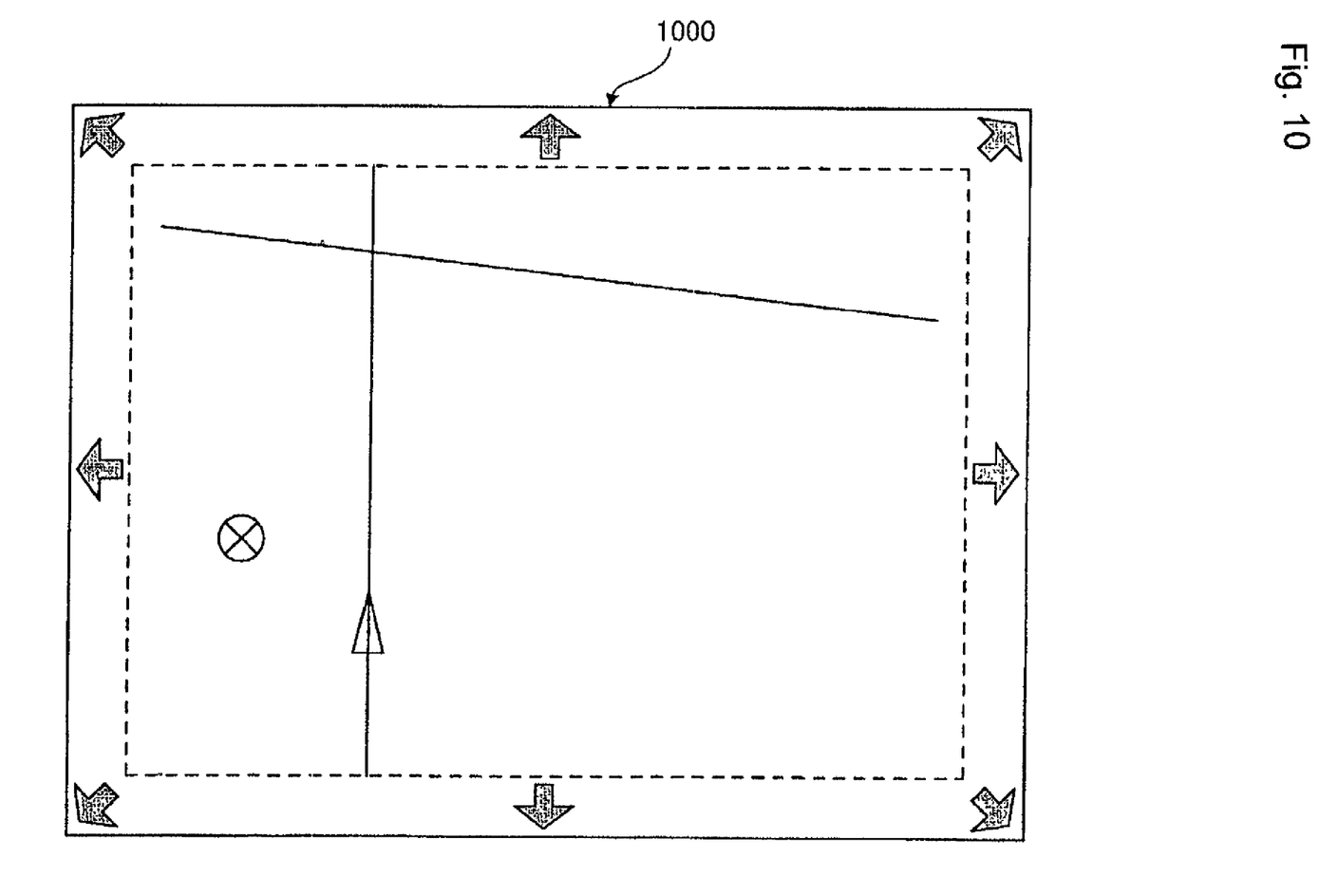
FIG. 10 shows another example for describing how display controlling is done on the conventional touch panel.

There is another conventional technique for employing the display method that uses a virtual screen and a touch panel, which is used as a pointing device. The technique is materialized as a navigation system as disclosed in Published Unexamined Patent Application No. 2000-180188. FIG. 10 is an illustration for describing the conventional technique disclosed in the specification. According to this technique, an edge portion of a display screen 1000 of the navigation system is touched so as to scroll the displayed item in the specified direction and display a range that is beyond the currently displayed map on the display screen.

PROBLEMS TO BE SOLVED BY THE INVENTION

The conventional technique, however, still has a problem that must be solved. The display screen is reduced in size unavoidably by the size of the touch input accepting area. This is because outside the display screen is provided a certain area used to accept touch inputs. And, this is not favorable for lap-top personal computers that have been devised so as to obtain a larger display screen respectively, since their sizes are limited physically.

In the case of another conventional technique, because an edge portion of the display screen is touched so as to scroll the displayed item thereon, a certain area for accepting touch inputs is provided outside the display screen. This is why there is no need to reduce the size of the display screen itself. This function is certainly effective in such specific closed application programs as the above-described navigation system. In spite of this, the function might also arise a problem in case it is executed under such a general-purpose environment as the basic screen (desk-top screen) of an operating system.

Concretely, there are often displayed icons and application program buttons around the periphery of the display screen under such a general-purpose environment. In case a peripheral point of the display screen is touched, therefore, it is impossible to decide whether or not the operator has pointed an object or the operator wants to scroll the item displayed on the display screen. And, the displayed item might possibly be scrolled against the operator's intention even when the operator points an object on the screen certainly.

SUMMARY OF THE INVENTION

Under such circumstances, it is an aspect of the present invention to provide a method for controlling the movement of a display area to a displayed image set outside the display screen with a touch on the display screen; there is no need to provide an area for accepting such the touch input outside the display screen.

It is another aspect of the present invention to provide a method for controlling the movement of the display area to the displayed image set outside the display screen with a touch on the display screen under such a general-purpose environment as the basic screen of an operating system.

DESCRIPTION OF SYMBOLS

11 . . . Mouse emulator
12 . . . Operation event detector
13 . . . Cursor movement information generator
14 . . . Cursor movement controller
15 . . . Virtual screen controller
100 . . . Touch panel unit
310 . . . Touch panel controller
320 . . . Serial driver
330 . . . Touch panel driver
340 . . . Mouse driver
600 . . . Input screen
601 to 604 . . . Operation area
1101 . . . Display image
1102 . . . Display area

DETAILED DESCRIPTION OF THE INVENTION

In order to attain the above aspects, the data processor of the present invention employs a touch panel as input means. The data processor converts an input done by touching the touch panel to a movement of a cursor. And, the data processor includes: an operation event detector for detecting an operation preset so as to be distinguished from other normal inputs; a movement information generator for generating movement information used to move the cursor positioned at the periphery of the display screen to the outside thereof according to a type of the detected operation; a cursor movement controller for moving the position of the cursor on a display image according to the generated movement information; and a display controller for scrolling an item displayed on the display screen according to this cursor movement.

This data processor may be such a computer apparatus as a personal computer, a work station, etc., as well as a PDA device, a home electric appliance provided with a touch panel, for example. The display controller may be, for example, a video driver installed in a computer apparatus.

The operation event detector detects a preset operation done in an operation area set on the input screen of the touch panel. The operation area matches with the display screen in size.

This operation area may be set at any place on the display screen. Preferably, it should be set at the periphery of the touch panel input screen. The "periphery" means an area beginning at the extreme outside of the touch panel input screen and having a width enough to be touched by a finger or a stylus pen so as to enable a predetermined operation.

And, because the input screen matches with the display screen in size as described above, a displayed image is also displayed in this operation area. This operation area accepts not only preset operations, but also normal inputs.

The operation area may also be configured so that keeping a touch in the operation area for a certain time is defined as a preset operation and the movement information generator decides a moving direction of the cursor in the movement information generated according to the touched point in the operation area.

Furthermore, the operation area may be configured so that moving the cursor in a fixed direction in the operation area according to a normal input is defined as a preset operation and the movement information generator decides a moving direction of the cursor in the movement information generated according to the moving direction of the cursor in the operation area.

Furthermore, the data processor of the present invention is provided with a basic controller for creating an input/output screen for accepting and outputting various input processings via the GUI and controlling the movement of the cursor on the input/output screen; an input controller for converting an input made via a touch panel to movement information of the cursor in the basic controller and for sending the input to the basic controller; and a display controller for generating a display image larger than a display screen on the basis of this input/output screen, setting a display area whose size corresponds to that of the display screen on the display image and displaying the display area on the display screen. The input controller is provided with an operation event detector for detecting an operation preset so as to be distinguished from other normal inputs done on the touch panel; and a movement information generator for generating movement information used to move the cursor positioned at the periphery of the display screen to the outside thereof according to a detected operation type and sending the generated movement information to the basic controller. The display controller may be configured so that the cursor, when moving beyond the display area, moves the display area in the direction in which the cursor moves on the display image.

The basic controller may be, for example, an operating system installed in such a computer as a personal computer, etc. The input controller may be, for example, a touch panel driver for controlling the operation of the touch panel.

Furthermore, the present invention provides an input/output device configured as follows. Concretely, this input/output device is configured by a touch panel unit for accepting an input done by touching an image displayed on the display screen and a processor for converting an input made via the touch panel unit to a movement of the cursor. The processor generates movement information used to move the cursor positioned at the periphery of the display screen to the outside thereof in case an operation preset so as to be distinguished from other normal inputs is done in the input screen of the touch panel unit. The touch panel unit displays an image on the display screen according to a display instruction issued on the basis of the movement information generated by the processor and scrolls the image.

The input/output device may also be configured by a touch panel unit for accepting an input done by touching an image displayed on the display screen and a display controller for generating an image displayed on the display screen. This touch panel unit is provided with an operation area having a predetermined space on the display screen. This display controller scrolls an item displayed on this display screen in case a specific touch input is done in the operation area of the display screen.

Furthermore, the present invention provides a touch panel controlling method, which includes a step of detecting an operation preset so as to be distinguished from other normal inputs done on this touch panel and a step of generating movement information used to move the cursor positioned at the periphery of the display screen to the outside thereof.

The step of detecting such a preset operation includes a step of detecting such a preset operation done in a fixed area at the periphery of the display screen.

This detecting operation may be defined as an operation in which a touch is continued for a certain time in the certain area at the periphery of the display screen and the step of generating cursor movement information includes a step of deciding a moving direction of the cursor in the movement information generated according to the touched point in the certain area.

This detecting operation may also be defined as an operation for moving the cursor as a normal input done in the certain area at the periphery of the display screen and the step of generating such the cursor movement information may include a step of deciding a moving direction of the cursor to be set in the generated movement information according to the moving direction of the cursor in this fixed area.

Furthermore, the present invention can create processings corresponding to those steps as a touch panel driver, which is a program to be executed by a computer and provide those processings as a recording medium that stores the touch panel driver and/or as a program transmitter that transmits the touch panel driver.

Furthermore, the touch panel controlling method of the present invention includes a step of detecting an operation preset so as to be distinguished from other normal inputs done on this touch panel and a step of scrolling an item displayed on the display screen according to a type of this detected operation.

PREFERRED EMBODIMENT

Hereunder, the preferred embodiment of the present invention will be described with reference to the accompanying drawings.

Figure 2:
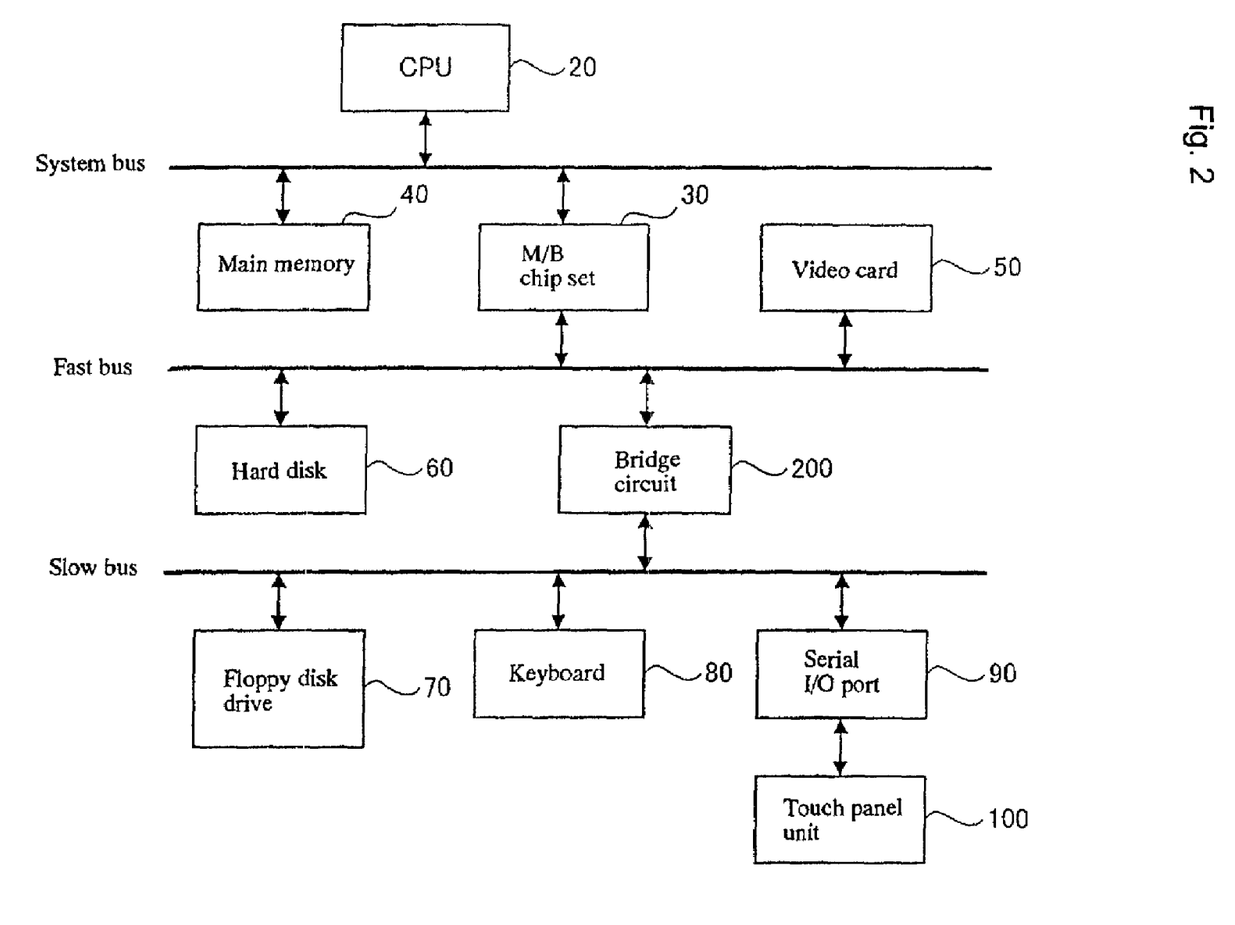
FIG. 2 is a block diagram of a computer apparatus that realizes a touch panel controlling method in the embodiment of the present invention.

FIG. 2 is a block diagram of a computer apparatus that realizes the above described touch panel controlling method in the embodiment of the present invention.

In FIG. 2, the computer apparatus is provided with a CPU (central processing unit) 20; an M/B (mother board) chip set 30 and a main memory 40 connected to the CPU 20 via a system bus respectively; a video card 50 and a hard disk 60, connected to the M/B chip set 30 via such a fast bus as a PCI bus respectively; a floppy disk drive 70, a keyboard 80, and a serial I/O port 90 connected to the M/B chip set 30 via a bridge circuit 200 and such a slow bus as an ISA bus respectively; and a touch panel unit 100 connected to the serial I/O port 90.

Note that, however, FIG. 2 shows just a configuration example of the computer apparatus that realizes the touch panel controlling method in this embodiment; the computer apparatus may be configured as any system that can have this embodiment. For example, while the touch panel unit 100 is connected to the system via the serial I/O port 90 in FIG. 2, the unit 100 may also be connected to the system via any of a parallel I/O port and a USB (Universal Serial Bus). And, the system may be configured so that the video card 50 is replaced with only a video memory and the CPU 20 itself executes drawing instructions. In addition, although not illustrated in FIG. 2, a general computer system is connected to a mouse, a voice input/output mechanism, a CD-ROM, etc. as input means.

This embodiment can also be realized by such a hardware configuration not only as a computer apparatus of a personal computer, a work station, etc. as shown in FIG. 2, but also as each of various PDA (Personal Digital Assistant) devices, TV sets and other home electric appliances controlled by a computer and provided with a touch panel as input means respectively.

Figure 3:
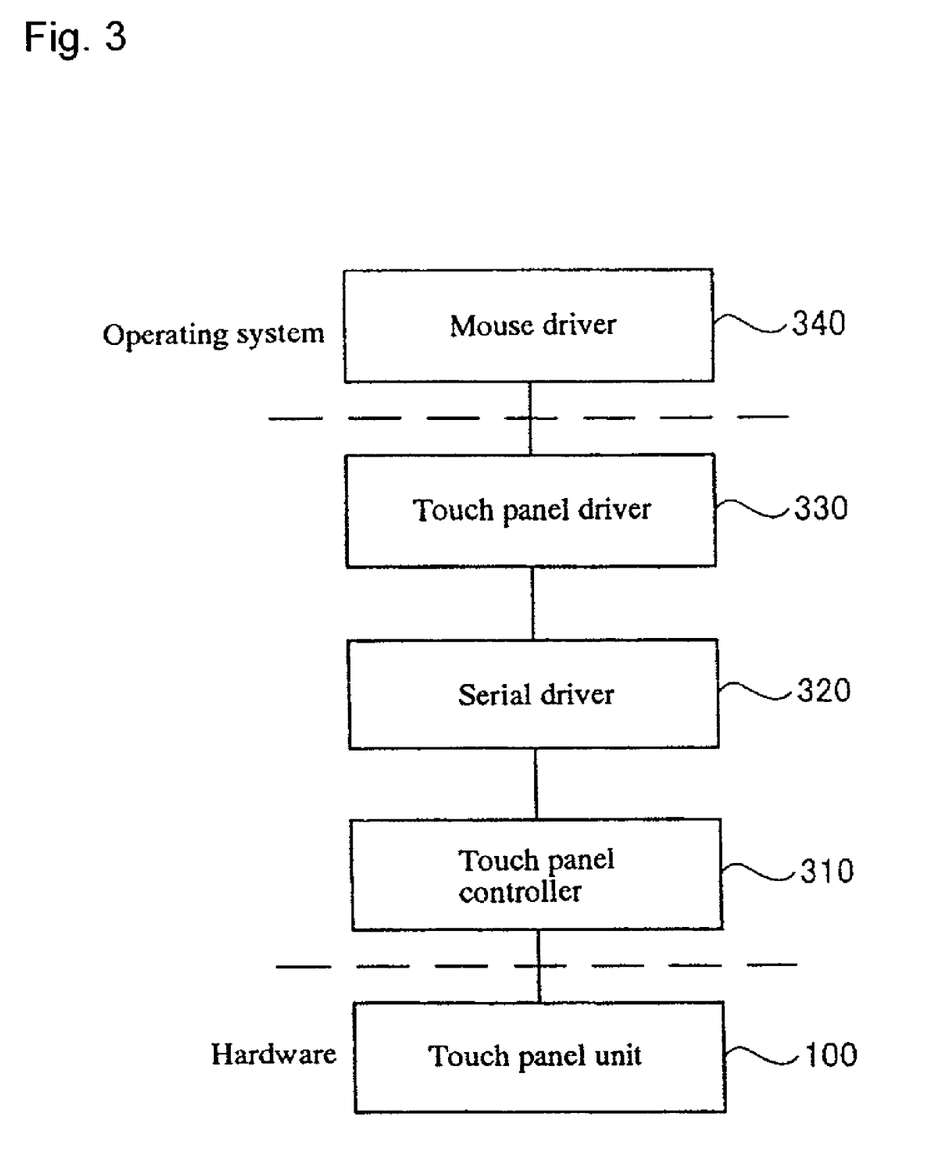
FIG. 3 is a block diagram of a software configuration that realizes the touch panel controlling method in the embodiment of the present invention.

FIG. 3 is a software configuration for realizing the touch panel control in this embodiment.

In FIG. 3, data inputted via a touch panel unit 100 is coordinate data used on the touch panel, which corresponds to the display screen at one to one. This input data is transferred to a touch panel driver 330 via a touch panel controller 310 and a serial driver 320 that controls a serial I/O port. The input data is processed by the touch panel driver 330.

The touch panel driver 330 converts the coordinate data to movement data of the cursor. And, as to be described later, the touch panel driver detects a specific operation event from among touch inputs to the touch panel unit 100 and converts the event to the corresponding movement data of the cursor. The cursor generated such way is transferred to the mouse driver 340 of the operating system.

The operating system can thus handle inputs from the touch panel unit 100 just like inputs from a mouse.

FIG. 3 is just a software configuration example for realizing this embodiment that is expected to be the computer apparatus shown in FIG. 2. The software configuration may be varied according to the hardware configuration to which the connection means of the touch panel unit 100 and this embodiment apply in case the configuration includes means for emulating the input via the touch panel unit 100 so as to be converted to data that can be processed by the mouse driver 340. And, the configuration may control the movement of the cursor directly according to the data inputted via the touch panel unit 100 without using the mouse driver 340.

Figure 1:
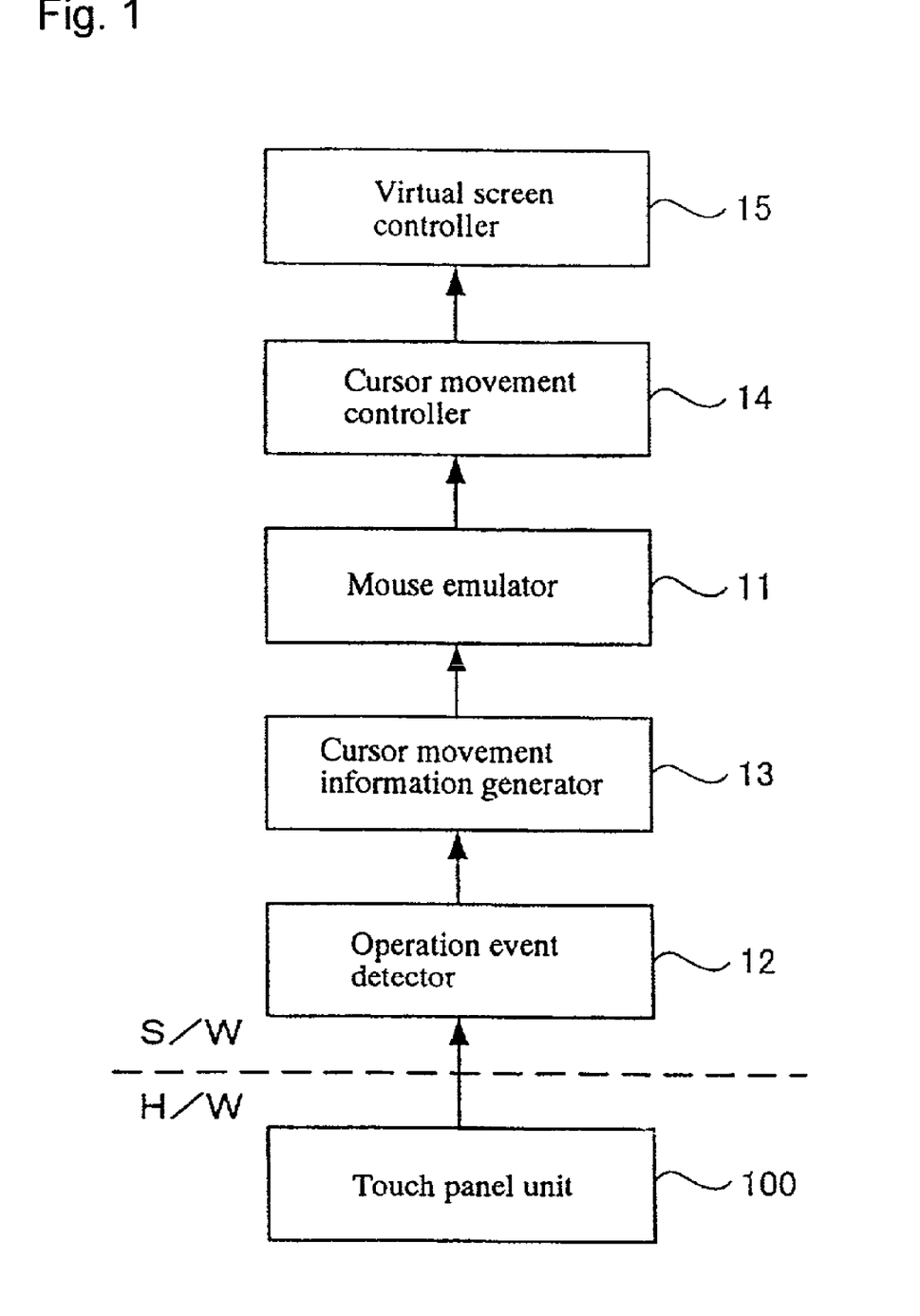
FIG. 1 is a block diagram of a touch panel controlling system in an embodiment of the present invention.

FIG. 1 is a block diagram of a touch panel controlling system in this embodiment.

In FIG. 1, the touch panel controlling system according to this embodiment is provided with a mouse emulator 11 for converting a touch input to the touch panel unit 100 to a mouse input; an operation event detector 12 for detecting a specific operation event from among touch inputs to the touch panel unit 100; a cursor movement information generator 13 for generating movement information of the cursor according to the operation event detected by the operation event detector 12; a cursor movement controller 14 for controlling the movement of the cursor according to a mouse input; and a virtual screen controller 15 used as a display controller for controlling the movement of a display area on an image displayed on the display screen of the touch panel unit 100 according to a cursor movement. In FIG. 1, each arrow denotes a data flow.

Each component shown in FIG. 1 is a virtual software block realized by the CPU shown in FIG. 2, which is controlled by a computer program. This computer program, for example, is read into the main memory 40 shown in FIG. 2 and used to control the operation of the CPU 20. The computer program is stored in such a recording medium as a CD-ROM, a floppy disk, etc. and transferred via a network so as to be supplied to the users.

In the above configuration, the mouse emulator 11, the operation event detector 12, and the cursor movement information generator 13 are provided as functions of, for example, the touch panel driver 330 shown in FIG. 3.

The mouse emulator 11, as described above, converts coordinate data inputted via the touch panel unit 100 to cursor movement data, which is equivalent to mouse input data. The mouse emulator 11 then outputs the converted data.

The operation event detector 12 detects a specific operation from among touch inputs to the touch panel unit 100 as an operation event. The specific operation is, for example, a touch input done in a specific procedure at a specific point of the touch panel unit 100. The details of the operation event will be described later.

The cursor movement information generator 13 generates and outputs movement data that denotes a movement of the cursor by a preset distance in a preset direction according to an operation event type detected by the operation event detector 12. The concrete operation of the cursor movement information generator 13 will be described later together with the content of the operation event.

The cursor movement controller 14 is realized, for example, as a function of the mouse driver 340 shown in FIG. 3. The cursor movement controller 14 moves the cursor on an image displayed on the display screen according to the cursor movement data output from the mouse emulator 11 and the cursor movement information generator 13 and points to an object as needed.

The virtual screen controller 15 is realized, for example, as a function of the video driver for controlling an operation of the video card 50 shown in FIG. 2. The virtual screen controller 15 controls the video card 50 so as to create drawing data for an image according to a draw instruction output from the CPU 20. The virtual screen controller 15 also controls the virtual screen display so as to set a display area on the image. The set display area is displayed actually on the display screen.

The method for controlling the display on the virtual screen may be a conventional general one. Concretely, a ¼ area of the image 1101 is displayed on the display screen while the resolution of the display image 1101 is 1600 (dots)×1200 (dots) and the resolution of the display area 1102 is 800 (dots)×600 (dots). The display area 1102 is moved according to the movement of the cursor. Concretely, in case an operation for moving the cursor to the outside of the display screen while the cursor is positioned at the periphery of the display screen, the display area 1102 is moved in the moving direction of the cursor according to the operation.

Figure 4:
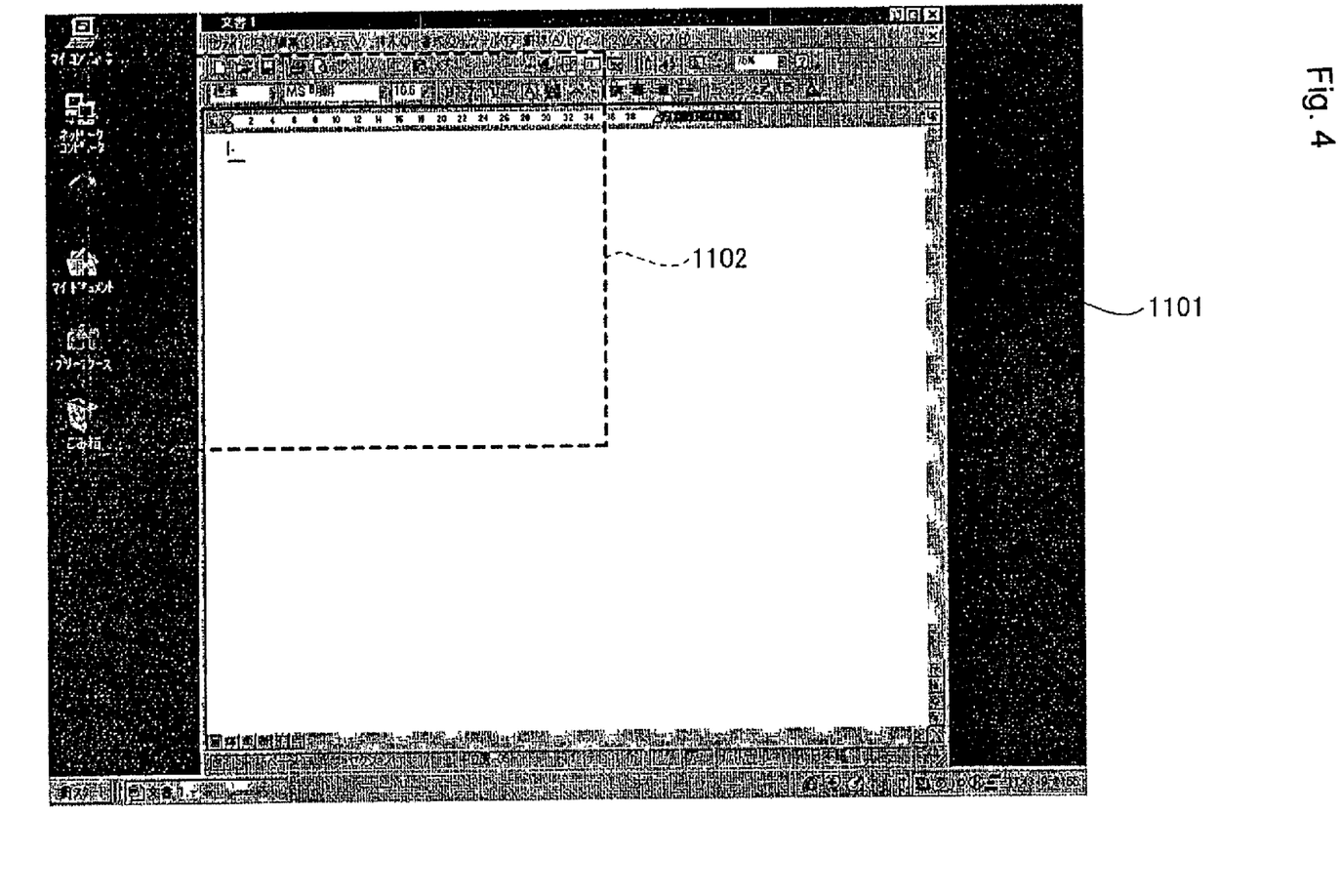
FIG. 4 shows how a display area is set on the basic (desk-top) screen of an operating system.
Figure 5:
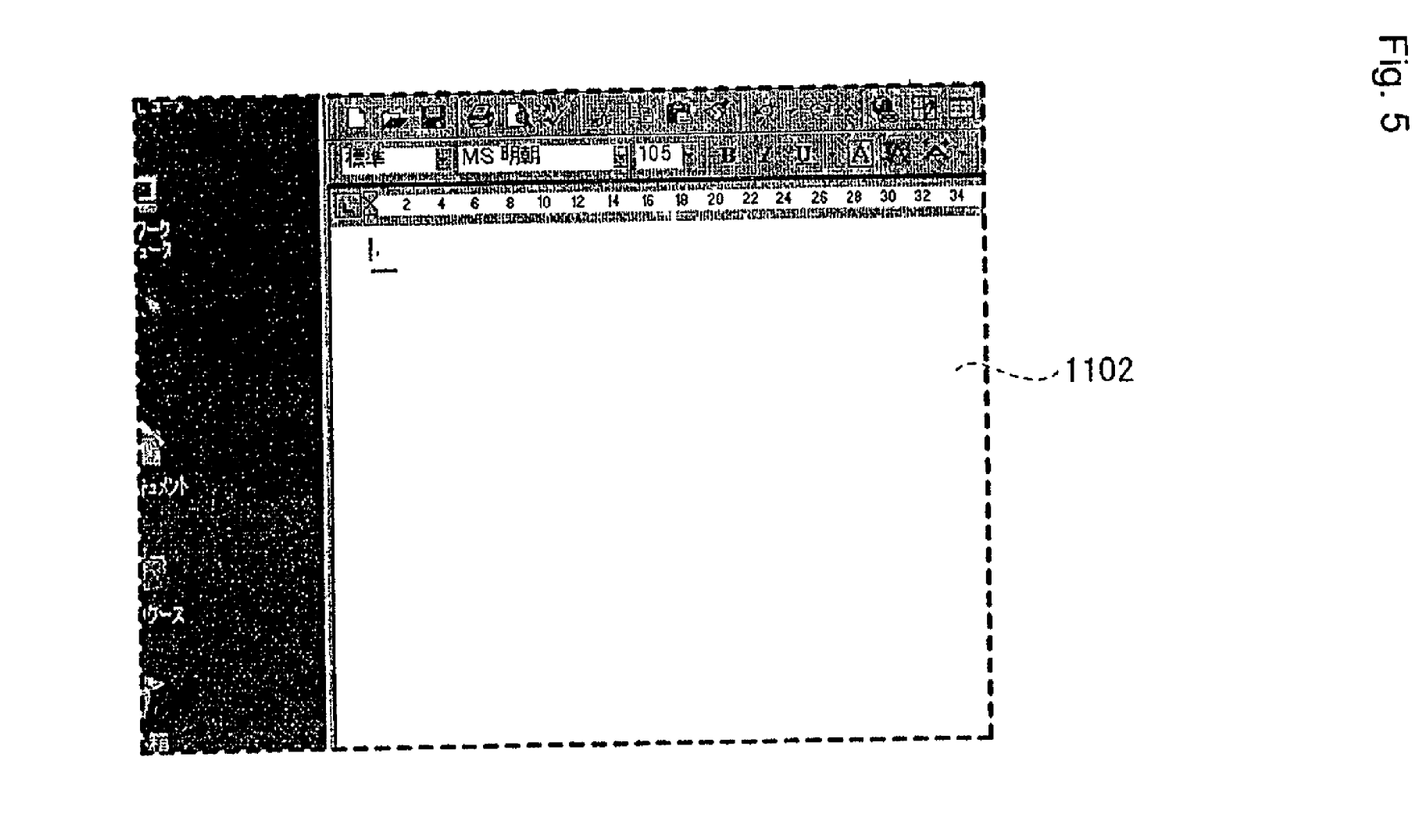
FIG. 5 shows how the display area in FIG. 4 is displayed on the display screen.

FIG. 4 shows how the display area 1102 is set by assuming the basic screen (desk-top screen) of the Windows as a display image 1101. The Windows is an operating system of Microsoft Inc., USA. FIG. 5 shows how the display area 1102 shown in FIG. 4 is displayed on the display screen.

While the desk-top screen of the operating system is expected to be displayed fully on the display screen, the desk-top screen can also be displayed on a lower resolution display screen even when it is created in a high resolution in case the above-described conventional technique is used to control the virtual screen display.

Next, a description will be made for how the cursor movement is controlled in specific operations executed by the operation event detector 12 and the cursor movement information generator 13.

Figure 6:
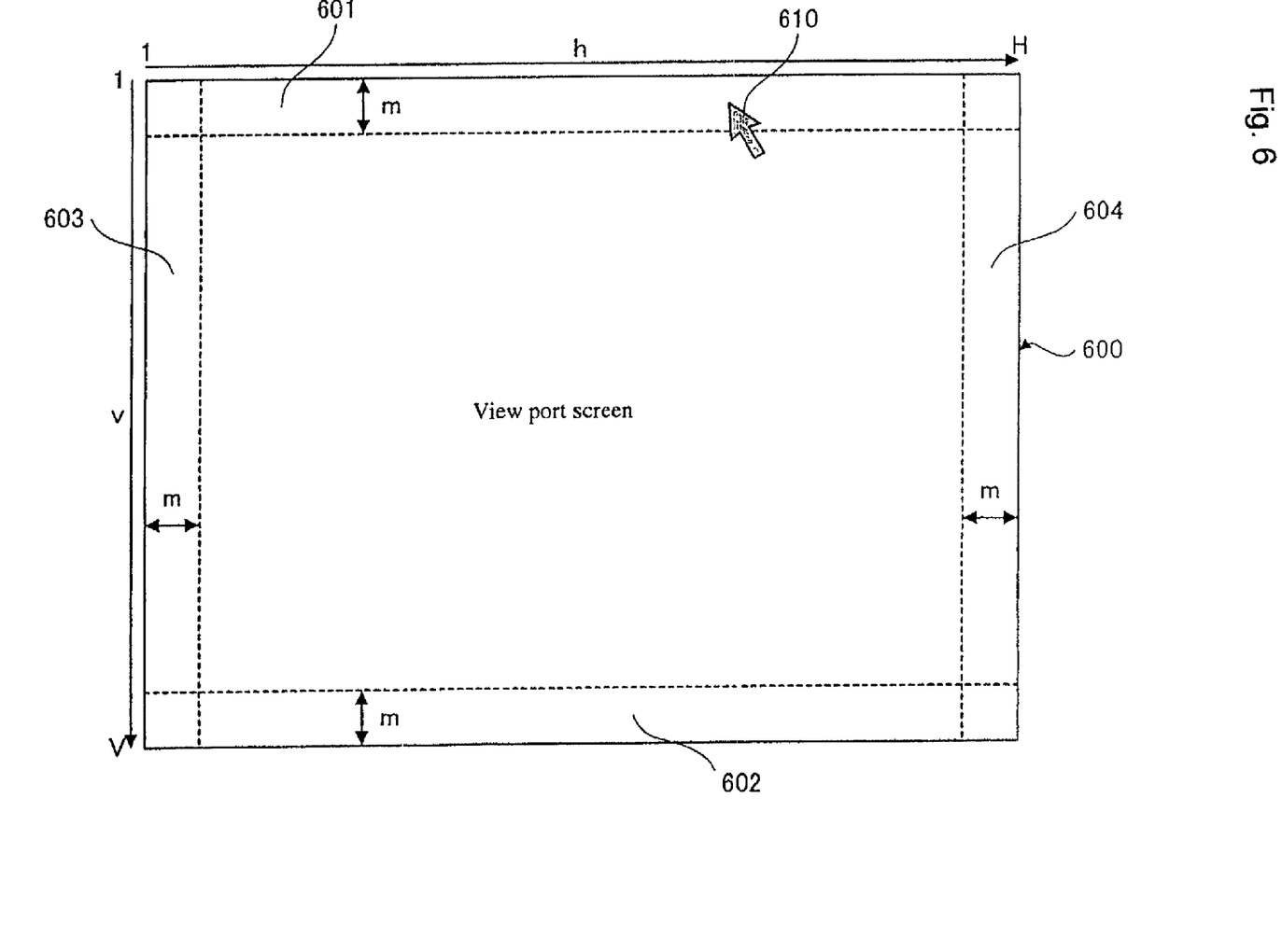
FIG. 6 is a configuration of an input screen of a touch panel unit in the embodiment of the present invention.

FIG. 6 is a configuration of the input screen of the touch panel unit 100 (hereinafter, to be referred to simply as the input screen) in this embodiment.

In FIG. 6, operation areas 601 to 604 are provided with a predetermined width respectively at the periphery of the input screen 600. Each of the operation areas 601 to 604 has a space spread enough to be touched by a finger or a stylus pen and operated as predetermined from the outermost periphery of the input screen 600. The widths of the operation areas 601 to 604 may be identical to or different from each another. The operation event detector 12 detects an operation event when a specific touch input is done in any of those operation areas 601 to 604 by a finger or a stylus pen.

The cursor movement information generator 13 generates movement data used to move the cursor 610 positioned at the periphery of the display screen further to the outside as shown in FIG. 6 according to an operation event type detected by the operation event detector 12. In FIG. 6, the generator 13 generates movement data for moving the cursor further upward from the top operation area 601 in the input screen 600. Then, the cursor movement controller 14 moves the cursor 610 according to this movement data.

Because the movement of the cursor 610 is visible on the display screen, a movement of the cursor 610 is described above like, for example, "moving the cursor further to the outside of the periphery of the display screen." And, because the display area 1102 displayed on the display screen is part of the display image 1101 created by an operating system, etc., the operating system and the mouse driver 340 supplied by the operating system regards such the movement of the cursor simply as a movement on the display image 1101.

And, because the cursor 610 has moved beyond the boundary of the display area 1102 in FIG. 6, the virtual screen controller 15 comes to move the display area 1102 under the local control of the video driver (not under the control of the operating system).

Next, a description will be made for operations to be made in the operation areas 601 to 604 on the input screen 600 of the touch panel unit.

In this embodiment, the input screen 600 and the display screen are the same in size and overlaid on each other completely. Consequently, an image positioned at the periphery of the display area 1102 on the display image 1101 are also displayed at the periphery of the display screen corresponding to the operation areas 601 to 604. Sometimes, therefore, icons and application buttons on the display image 1101 are displayed there. Consequently, in case an attempt is done to move the display area 1102 simply by touching any of the operation areas 601 to 604 with a finger or stylus pen, the touch might be regarded as an attempt for operating an icon/button on the operation area 601 to 604, thereby the display area 1102 is moved, causing a malfunction to occur in operations of those icons and buttons.

In order to avoid such a trouble, therefore, it is required to preset specific operations so that the operation event detector 12 can distinguish operation events from other simple touches. The contents of such an operation (concretely, a condition for generating an operation event) may be any one in case it can be distinguished from simple touches. Hereinafter, two typical operations in this embodiment will be described in detail.

The first operation proposed in this embodiment is a touch continued for a certain time in any of the operation areas 601 to 604.

In order to realize this operation, a time-out condition is set so as to generate an operation event in case any of the operation areas 601 to 604 is kept touched for more than the time t. Consequently, in case a finger or stylus pen is kept touched in the operation area 601 to 604 for the time t, the operation event detector 12 detects the time-out, thereby the cursor movement information generator 13 generates movement information of the cursor 610 in response to the detected time-out.

The above processings will be described in detail with reference to FIG. 6.

The initial setting is done as follows: The number of dots for moving the cursor 610 relatively is defined as d in the movement data generated by the cursor movement information generator 13 for one time-out. And, the X and Y direction coordinates of the cursor 610 on the input screen 600 are defined as h ($1 \leq h \leq H$) and v ($1 \leq v \leq V$), respectively and the width of each of the operation areas 601 to 604 is m. Furthermore, it is assumed that the virtual screen controller 15 moves the display area 1102 by d dots in the same direction as that of the cursor 610 on the display image 1101 when the cursor 610 moves to the outside of the display area 1102 by d dots.

At first, in case a time-out is detected while the Y coordinate v of the cursor 610 satisfies $1 \leq v \leq m$ (corresponding to the operation area 601), the cursor movement information generator 13 moves the cursor upward by d dots according to the operation event detected by the operation event detector 12. Then, the display area 1102 is moved upward by d dots under the control of the virtual screen controller 15.

In case a time-out is detected while the Y coordinate v of the cursor 610 satisfies $V-m \leq v \leq V$ (corresponding to the operation area 602), the cursor movement information generator 13 moves the cursor downward by d dots according to the operation event detected by the operation event detector 12. Then, the display area 1102 is moved downward by d dots under the control of the virtual screen controller 15.

In case a time-out is detected while the X coordinate h of the cursor 610 satisfies $1 \leq h \leq m$ (corresponding to the operation area 603), the cursor movement information generator 13 moves the cursor to the left by d dots according to the operation event detected by the operation event detector 12. Then, the display area 1102 is moved to the left by d dots under the control of the virtual screen controller 15.

In case a time-out is detected while the X coordinate h of the cursor 610 satisfies $H-m \leq h \leq H$ (corresponding to the operation area 604), the cursor movement information generator 13 moves the cursor to the right by d dots according to the operation event detected by the operation event detector 12. Then, the display area 1102 is moved to the right by d dots under the control of the virtual screen controller 15.

Consequently, when the operator touches any of the operation areas 601 to 604, the cursor 610 moves to the touched point. And, in case the finger/stylus pen is kept touched there for the time t, which is a time-out condition, then the display area 1102 is moved on the display screen so as to scroll the item displayed on the display screen upward/downward/to the right/to the left. While the operator further keeps his/her finger/stylus pen touched there after the display area 1102 is moved, the item displayed on the display screen is kept scrolled each time the time, which is a time-out condition, is over.

While the operation areas 601 to 604 are overlaid on the corners (coordinates of the four places (1 to m, 1 to m), (H−m to H, 1 to m), (1 to m, V−m to V), (H−m to H, V−m to V)) of the input screen 600 in the above description, controlling is done at those corners with no contradiction in case, for example, either the horizontal movement or the vertical movement takes precedence.

Figure 7:
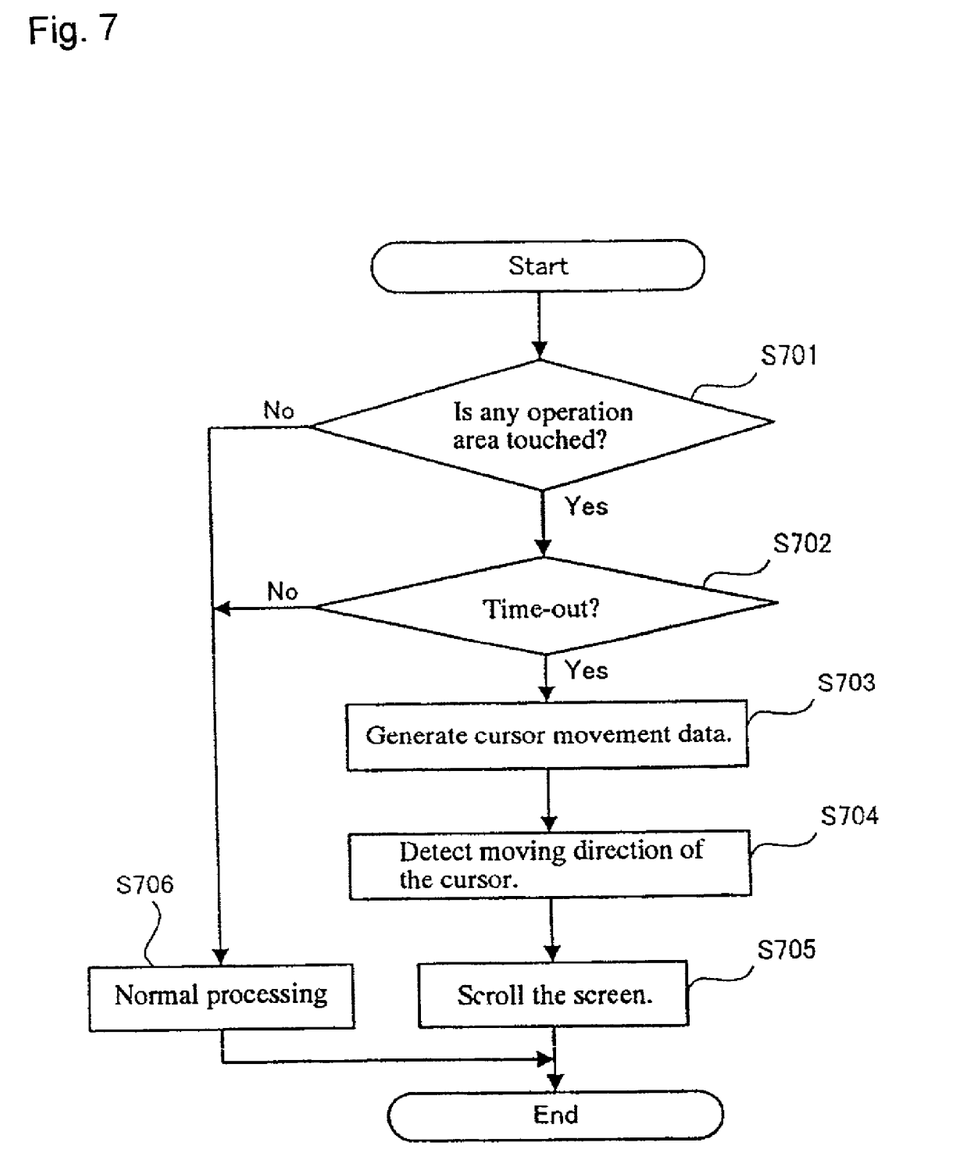
FIG. 7 is a flowchart for describing a processing flow of a first specific operation in the embodiment of the present invention.

FIG. 7 is a flowchart for describing a processing flow of the above-described first operation.

In FIG. 7, at first, one of the operation areas 601 to 604 is touched (step 701) and the touch is continued for a certain time until the time-out condition is satisfied (step 702). The operation event detector 12 then detects the operation. And, the cursor movement information generator 13 generates movement data used to move the cursor 610 according to the touched operation areas 601 to 604 (step 703). After that, the cursor movement controller 14 moves the cursor 610 according to the generated movement data. Then, the virtual screen controller 15 moves the display area 1102 according to this cursor movement, so that the item displayed on the display screen is scrolled upward/downward/to the right/left (steps 704 and 705). In case a point outside any of the operation areas 601 to 604 is touched and the time-out condition is not satisfied (the decision is NO in steps 701 and 702) at that time when any of the operation areas 601 to 604 is touched, the touch is emulated to a mouse operation (normal processing) (step 706).

The second operation proposed in this embodiment is done so as to move the cursor 610 in a specific direction while contacting any of the operation areas 601 to 604.

In order to realize such the second operation, a directional condition is set so as to generate an operation event in case the cursor 610 positioned in any of the operation areas 601 to 604 is moved in a specific direction. It is a normal touch input to be emulated by the mouse emulator 11 what moves the cursor 610 there. Consequently, in case the cursor 610 positioned in any of the operation areas 601 to 604 is moved in a direction that satisfies the directional condition, the operation event detector 12 detects the operation and the cursor movement information generator 13 generates movement data for the cursor 610 according to the detected operation.

Hereunder, the above operations will be described more concretely with reference to FIG. 6. In this case, it is assumed that the moving distance of the cursor 610 is defined as d (dots) in the movement data generated by the cursor movement information generator 13 in case an operation that satisfies the directional condition is done once. Other initial set values are assumed to be the same as those of the above-described first operation.

At first, in case an operation is done so as to move the cursor 610 upward while the Y coordinate v of the cursor 610 satisfies $1 \leq v \leq m$ (corresponding to the operation area 601), the cursor movement information generator 13 moves the cursor 610 upward by d dots according to the operation event detected by the operation event detector 12. Then, the display area 1102 is moved upward by d dots under the control of the virtual screen controller 15.

In case an operation is done so as to move the cursor 610 downward while the Y coordinate v of the cursor 610 satisfies $V-m \leq v \leq V$ (corresponding to the operation area 602), the cursor movement information generator 13 moves the cursor 610 downward by d dots according to the operation event detected by the operation event detector 12. Then, the display area 1102 is moved downward by d dots under the control of the virtual screen controller 15.

In case an operation is done so as to move the cursor 610 from right to left while the X coordinate h of the cursor 610 satisfies $1 \leq h \leq m$ (corresponding to the operation area 603), the cursor movement information generator 13 moves the cursor 610 from right to left by d dots according to the operation event detected by the operation event detector 12. Then, the display area 1102 is moved to the left by d dots under the control of the virtual screen controller 15.

In case an operation is done so as to move the cursor 610 from left to right while the X coordinate h of the cursor 610 satisfies $H-m \leq h \leq H$ (corresponding to the operation area 604), the cursor movement information generator 13 moves the cursor 610 from left to right by d dots according to the event detected by the operation event detector 12. Then, the display area 1102 is moved to the right by d dots under the control of the virtual screen controller 15.

Consequently, when the operator touches the operation area 601, the cursor 610 goes to the touched point. In case the finger/stylus pen is moved upward in the area, the display area 1102 is also moved upward on the display screen so as to scroll the item upward on the display screen. In the same way, when the operator moves his/her finger/stylus pen in a predetermined direction in the area, the display area 1102 is moved in the direction, so that the item is scrolled in the direction on the display screen.

Figure 8:
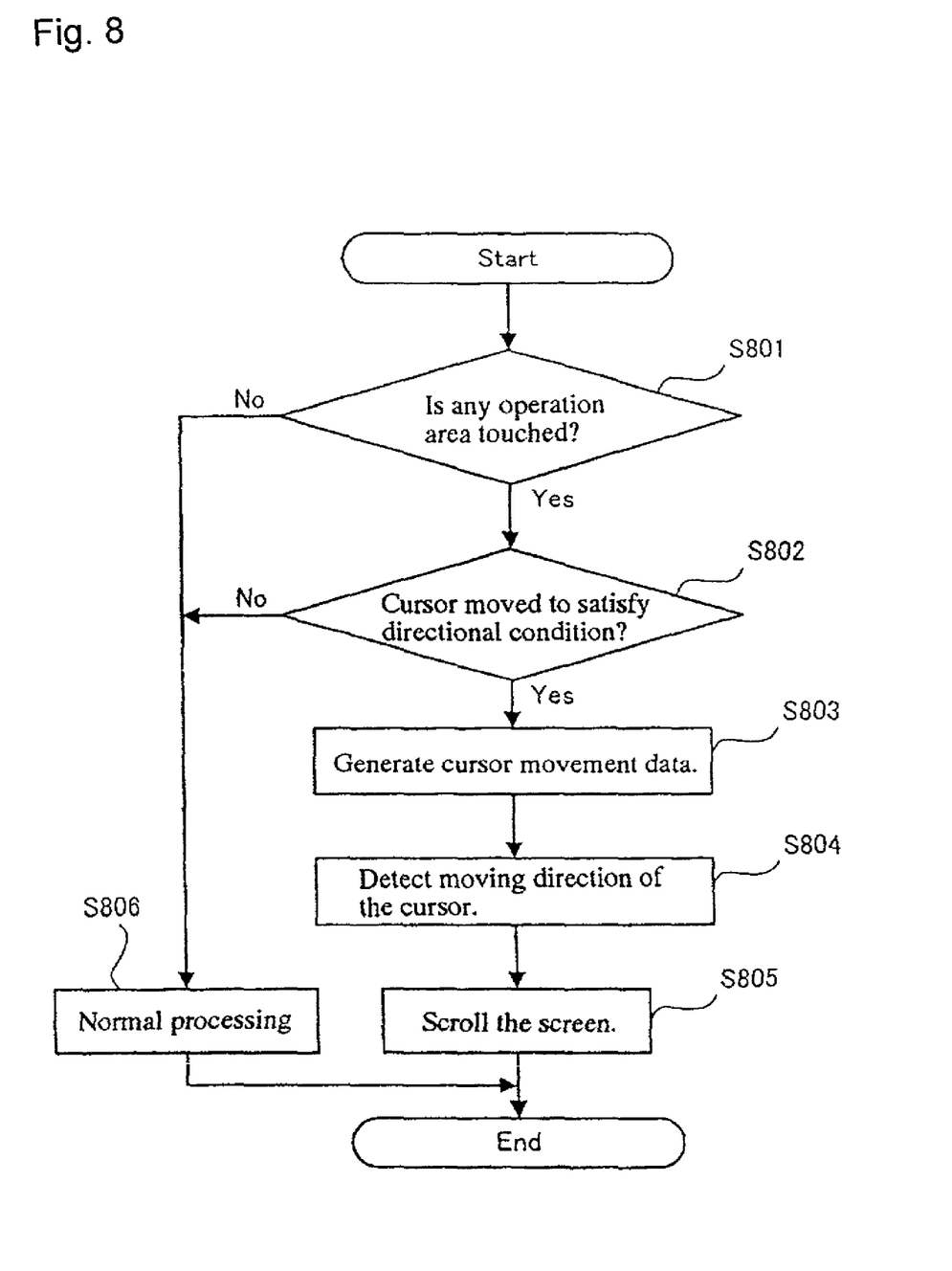
FIG. 8 is a flowchart for describing a processing flow of a second specific operation in the embodiment of the present invention.

FIG. 8 is a flowchart for describing a processing flow of the above-described second operation.

In FIG. 8, in case one of the operation areas 601 to 604 is touched (step 801) and the cursor 610 is moved so as to satisfy the directional condition in response to a normal touch input while contacting any of the operation areas 601 to 604 (step 802), the operation event detector 12 detects the operation. The cursor movement information generator 13 then generates movement data used to move the cursor 610 according to the moving direction of the cursor 610 (step 803). Then, the cursor movement controller 14 moves the cursor 610 according to the generated movement data. The virtual screen controller 15 thus moves the display area 1102 according to this cursor movement, so that the image is scrolled upward/downward/to the right/left on the display screen (steps 804 and 805). In case a point is touched outside any of the operation areas 601 to 604 and no operation is done so as to satisfy the directional condition though any of the operation areas 601 to 604 is touched (the decision is NO in steps 801 and 802), the touch is emulated to a mouse operation (normal processing) (step 806).

In the above second operation, it is possible to set a direction in which the cursor 610 is moved with a certain error taken into consideration. For example, in the operation area 601, the operation event detector 12 can detect not only upward movement of the cursor, but also slightly oblique movement.

Sometimes, the pointing finger/stylus pen might move slightly when the operator points a predetermined point with it manually on the touch panel. In such a case, a malfunction might occur; an item on the display screen is scrolled against the operator's intention. In order to avoid such a malfunction, therefore, a moving distance of the cursor is added to the operation event detecting condition so that the operation event detector 12 is controlled so as to detect an operation event in case the cursor is moved by a distance more than a predetermined value in any of the operation areas 601 to 604.

Furthermore, while the moving distance of the cursor 610 is d dots in the above operation example in case the directional condition is satisfied, it is also possible to add both moving speed and acceleration of the cursor 610 as operation event detecting condition. In case the cursor 610 moves fast in any of the operation areas 601 to 604, it is possible to control so that the moving distance of the cursor 610 is extended by the movement data generated by the cursor movement information generator 13.

Furthermore, in the operation example described above, a specific directional condition is given to each of the operation areas 601 to 604. Concretely, "upward" is given as a directional condition for the operation area 601 positioned above the input screen 600. "Downward" is given as a directional condition for the operation area 602 positioned below the input screen 600. "Left" is given as a directional condition for the operation area 603 positioned at the left side of the input screen 600. And, "right" is given as a directional condition for the operation area 604 positioned at the right side of the input screen 600. This means that moving a finger/stylus pen further to the outside of the first-touched point makes it easier to understand the movement of the display area 1102 in the direction intuitively.

It is also possible to move the display area 1102 upward in case the finger/stylus pen is moved upward and to the left in case the finger/stylus pen is moved to the left while the directional condition in each of the operation areas 601 to 604 is not fixed.

In this embodiment, it is premised that a specific operation done in any of the operation areas 601 to 604 provided on the input screen 600 is detected as an operation event by the operation event detector 12. From a technical viewpoint that a specific operation is corresponded to a movement of the cursor 610, however, the operation areas 601 to 604 are not necessarily required in this case. Concretely, in case specific operations that are not executed by any normal touch input are predetermined and such a specific operation is done, it is detected as an operation event by the operation event detector 12, thereby the cursor movement information generator 13 generates predetermined movement data.

ADVANTAGES OF THE INVENTION

As described above, according to the present invention, it is possible to control the movement of the display area to a display image set outside the display screen with a touch thereon; there is no need to provide any area for accepting such a touch input outside the display screen in this case.

Furthermore, according to the present invention, it is possible to control the movement of the display area to a display image set outside the display screen with a touch thereon in such an environment as the basic (desk-top) screen of an operating system.

What is claimed is:

1. A data processor that employs a touch panel as an input device for accepting an input made by touching the display of a display area of an image displayed on a display screen, wherein image information for said image is larger in size than said display screen and wherein only a display area of said image is displayed at any one time, and converts said input to a movement of a cursor, comprising:
    an operation event detector for detecting touch input, made by touching the image displayed on an image display area of a display screen, as operational input of an operation preset for an operation type as distinguished from other normal inputs to be done on the same display area of said touch panel;
    a movement information generator for generating movement information used to move said cursor positioned at the periphery of said display screen to the outside thereof according to the operation type detected by said operation event detector;
    a cursor movement controller for moving the position of said cursor on said displayed image according to said movement information generated by said movement information generator; and
    a display controller for moving the display area relative to the image according to a movement of said cursor moved by said cursor movement controller.

2. The data processor according to claim 1;
    wherein said operation event detector detects said touch input of an operation preset made in an operation area set on the input screen of said touch panel, said operation area matching with said display screen in size.

3. The data processor according to claim 1;
    wherein said operation event detector detects said touch input of an operation preset made in said operation area set at the periphery of said input screen of said touch panel, said operation area matching with said display screen in size.

4. The data processor according to claim 1;
    wherein said operation event detector detects said touch input of an operation preset made in said operation area set at the periphery of said input screen of said touch panel, wherein said preset comprises a touch being continued in said operation area for a certain time; and
    said movement information generator decides a moving direction of said cursor in said movement information generated according to a position touched in said operation area.

5. The data processor according to claim 1;
    wherein said operation event detector detects said touch input of an operation preset, wherein said preset comprises said cursor being moved by said touch input in a predetermined manner in said operation area set at the periphery of said input screen of said touch panel; and
    said movement information generator decides a moving direction of said cursor in said movement information generated according to a moving direction of said cursor in said operation area.

6. A data processor that employs a touch panel as an input device for accepting an input made by touching an image displayed on a display screen, comprising:
    a basic controller for creating an input/output screen for accepting and outputting various input processings via a GUI so as to control the action of a cursor on said input/output screen;
    an input controller for converting an input made via said touch panel to movement information of said cursor in said basic controller and for sending the input to the basic controller; and
    a display controller for generating a display image larger than said display screen on the basis of said input/output screen, setting a display area in a size corresponding to said display screen on said display image, and displaying said display area on said display screen,
    wherein said input controller includes:
    an operation event detector for detecting touch input, made by touching the image displayed on an image display area of a display screen, as operational input of an operation preset for an operation type so as to be distinguished from other normal inputs to be done in the same area on said touch panel;
    a movement information generator for generating movement information used to move said cursor positioned at the periphery of said display screen to the outside thereof according to the operation type detected by said operation event detector, then sending said generated movement information to said basic controller; and
    said display controller moving said display area in a moving direction of said cursor on said display image in case said cursor moves beyond said display area.

7. The data processor according to claim 6;
    wherein said operation event detector of said touch input controller detects said touch input of an operation preset made in said operation area set at the periphery of said input screen of said touch panel, said operation area matching with said display screen in size; and said movement information generator of said input controller decides a moving direction of said cursor in said movement information generated according to a position of said operation made in said operation area.

8. An input/output device, comprising:
a display screen for displaying an image, wherein image information for said image is larger in size than said display screen and wherein only a display area of said image is displayed at any one time;
a touch panel unit for accepting an input made by touching the display area displayed on a display screen; and
a processor for converting an input made via said touch panel unit to movement of a cursor,
wherein said processor generates movement information used to move said cursor positioned at the periphery of said display screen to the outside thereof in case of input, made by touching the image displayed on an image display area of a display screen, as operational input of an operation preset, as distinguished from other touch normal inputs to said same area of the touch panel unit, on said input screen of said touch panel unit; and
said touch panel unit changes the display area of said image on said display screen according to a display instruction on the basis of said movement information generated by said processor.

9. The input/output device according to claim 8;
wherein said touch panel unit has an input screen in the same size as said display screen and an operation area for accepting both preset and other normal input operations at the periphery of said input screen; and
said processor generates said movement information of said cursor according to an operation done in said operation area on said input screen.

10. A touch panel controlling method for accepting an input made by touching an image displayed on a display screen, wherein image information for said image is larger in size than said display screen and wherein only a display area of said image is displayed at any one time, comprising the steps of:
detecting an operation type based on touch input, made by touching the image displayed on an image display area of a display screen, as operational input of an operation preset as distinguished from other normal inputs done on the display area displayed on said touch panel; and
generating movement information used to move said cursor positioned at the periphery of said display screen to the outside thereof according to the operation type of said detected operation; and
moving the display area relative to the image according to movement of said cursor.

11. The touch panel controlling method according to claim 10;
wherein said step of detecting said operation type includes a step of detecting an operation input done in a certain area at the periphery of said display screen.

12. The touch panel controlling method according to claim 10;
wherein said step of detecting said operation type includes a step of detecting said operation type when said operation preset comprises a touch continued for a certain time in said certain area at the periphery of said display screen; and
said step of generating movement information of said cursor includes a step of deciding a moving direction of said cursor in said movement information generated according to a position touched in said certain area.

13. The touch panel controlling method according to claim 10;
wherein said step of detecting said operation type includes a step of detecting said operation type when said operation preset comprises said cursor being moved in said certain area at the periphery of said display screen; and
said step of generating movement information of said cursor includes a step of deciding a moving direction of said cursor in said movement information generated, according to said moving direction of said cursor in said certain area.

14. A recording medium for storing a program to be executed by a computer, said program being enabled to be read by an input device of said computer;
wherein said program enables said computer to execute:
a processing for detecting an operation based on touch input, made by touching the image displayed on an image display area of a display screen, as operational input of an operation preset as distinguished from other normal inputs done on the same area of a touch panel used as an input device;
a processing for generating movement information used to move a cursor positioned at the periphery of said display screen to the outside thereof according to a type of said detected operation; and
a processing for moving a display area relative to an image according to movement of said cursor.

15. A program transmitter, comprising:
a memory device for storing a program that enables a computer to execute a processing for detecting an operation based on touch input, made by touching the image displayed on an image display area of a display screen, as operational input of an operation preset, as distinguished from other normal inputs done to the same area on a touch panel used as an input device, a processing for generating movement information used to move a cursor positioned at a periphery of a display screen to the outside thereof according to a type of said detected operation and a processing for moving a display area relative to an image according to movement of said cursor; and
a transmitter for reading said program from said memory device so as to transmit it.

* * * * *